United States Patent [19]

Hwang-Change

[11] Patent Number: 4,679,842
[45] Date of Patent: Jul. 14, 1987

[54] RETRACTABLE GLARE SHIELD DEVICE FOR AUTOMOBILES

[76] Inventor: Tsai Hwang-Change, No. 139, 6 Ling, Nan Jing Sugar Factory, Shui Shang Hsiang, Chiayi City, Taiwan

[21] Appl. No.: 883,526

[22] Filed: Jul. 8, 1986

[51] Int. Cl.⁴ ............................................. B60J 3/00
[52] U.S. Cl. ............................................. 296/97 G
[58] Field of Search ............................ 296/97 R, 97 G; 160/DIG. 3

[56] References Cited

U.S. PATENT DOCUMENTS

| | | | |
|---|---|---|---|
| 2,444,524 | 7/1948 | Parrish, Jr. | 296/97 G |
| 2,559,471 | 7/1951 | Schrock | 296/97 G |
| 2,862,762 | 12/1958 | McCormick | 296/97 G |
| 4,558,899 | 12/1985 | Chu et al. | 296/97 G |

Primary Examiner—Robert R. Song
Attorney, Agent, or Firm—Browdy and Neimark

[57] ABSTRACT

The present disclosure is concerned with a retractable glare shield device, particularly adapted for automobiles, consisting of a track bar inclinedly fixed on the ceiling of a vehicle, on which is slidably mounted a slider member having a pair of shaft bars planted on each side thereof to which are rotatably attached a pair of C-shaped clips used to hold a transparent filter plate in place so that the filter plate can be horizontally received under the ceiling when not used, and can be pulled down from its receiving position and located behind the windscreen of the vehicle for blocking some of the strong sun light from the eyes of the driver of the vehicle in a sunny day.

1 Claim, 10 Drawing Figures

RETRACTABLE GLARE SHIELD DEVICE FOR AUTOMOBILES

SUMMARY OF THE INVENTION

The present invention relates to a retractable glare shield device, more particularly to a transparent filter plate of stiff plastics mounted on a slider member which is slidably attached to a track bar inclinedly disposed on the ceiling of a vehicle, in such a manner that the filter plate can be horizontally received under the ceiling of the car when not used, alternatively be pulled down therefrom and positioned in front of the driver and behind the front windscreen for protecting the eyes of the driver from strong sunbeam.

It is commonly encountered especially driving in a sunny day or driving facing the sun at dawn or sunset, the bright sunbeam comes into the eyes of the driver directly and makes the driving almost impossible, thereby influencing the driving safety great deal. There are a number of resolutions adopted by people which includes disposing a tinted glass or using a movable sun visor, or the driver wearing a sun glasses. Those existing ways of protecting the eyes of drivers from being annoyed by strong light are not convenient or effective and safe enough. For example, the sun visor can block some sunlight from coming into eyes of drivers and also may interfere with the sight of driving, and the tinted glass is fixedly located without much flexibility.

Viewing the disadvantages associated with conventional approaches of shielding glare on vehicle drivers, the inventor has worked on a flexible or retractable glare shield device which can be received under the ceiling of a vehicle when not used, and be pulled down for use and positioned in front of the driver, and finally came to success after a plurality of experiments and improvements for some time.

The primary object of the present invention is to provide a retractable glare shield device particularly adapted for vehicle use, which comprises a track bar inclinedly disposed on the ceiling of a vehicle on which is slidably mounted a holding means which consists of a slider member, a pair of shaft bars and a pair of C clips which firmly holds in place a stiff transparent light filter plate made of plastics material, in such a manner the filter plate can be selectively disposed in front of the driver and the steering wheel and behind the front windscreen for the purpose of blocking the glare sunlight.

The secondary object of the present invention is to provide a retractable glare shield device for automobiles consisting of a track bar inclinedly and removably fixed on the ceiling of the vehicle with the track bar pointed to the center of said ceiling, thereby the slider member mounted thereon can be located with the center lines of a pair of shaft bars, on which rotatably planted a pair of C-shaped clips used to hold the filter plate, are parallel to the windsereen of the vehicle, so that said filter plate can always be moved parallely with respect to said windscreen and disposed therebehind, fully covering the whole area thereof.

One further object of the present invention is to provide a retractable glare shield device having a track bar on which a L-shaped hook is attached at the front end and a stop means disposed at the opposite end thereof so to prevent the slider member from disengaging from said track bar in sliding therealong, and the L-shaped hook is further served to firmly hold the front edge of the filter plate when it is horizontally received under the ceiling of the vehicle to prevent it from falling off from its horizontal receiving position.

One further object of the present invention is to provide a retractable glare shield device for automobiles use conisting of a stiff transparent filter plate which is configured with one of its corners removed so not to interfere with the normal operation of the rear-view mirror of the vehicle and the other side obliquely shaped to conform with the contour of the windscreen and also facilitate the operation of the receiving of said plate, and a slot-like opening disposed near the front side thereof for facilitating the holding of said filter plate in operation.

One further object of the present invention is to provide a retractable glare shield device for automobiles, consisting of a filter plate which can be pulled down from its receiving position for use and fixed behind the windscreen of a vehicle by means of a fixing means planted on the surface of the dashboard of the vehicle.

DETAILED DESCRIPTION OF THE INVENTION

Figure 1:
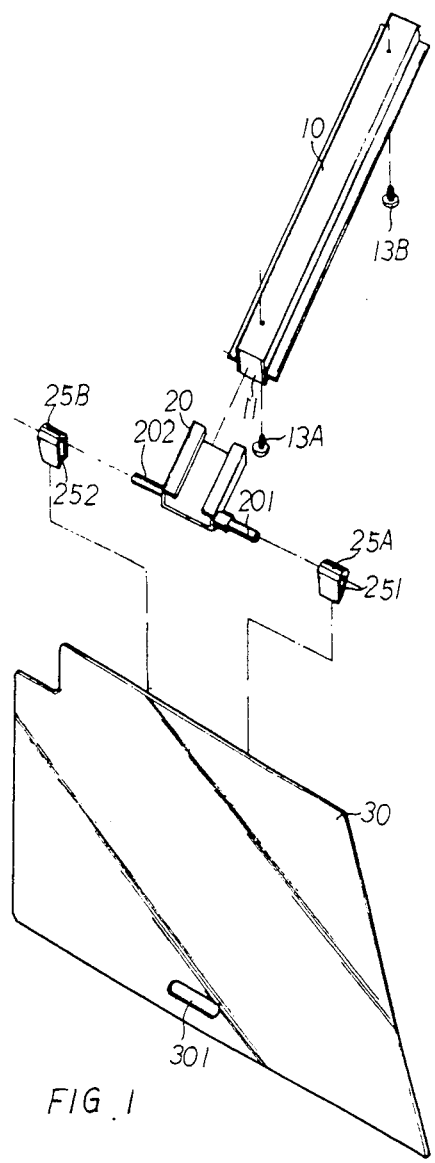
FIG. 1 is a perspective view of the exploded components of the present invention.
Figure 2:
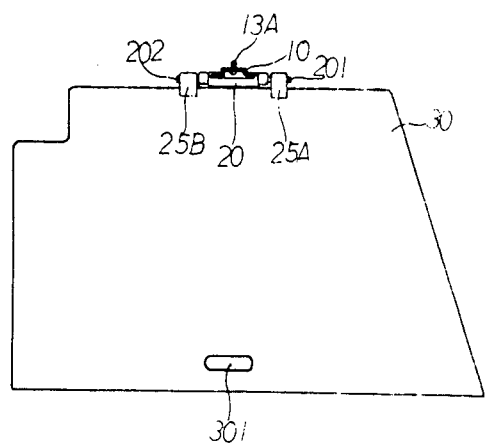
FIG. 2 is the front view of the present invention.
Figure 3:
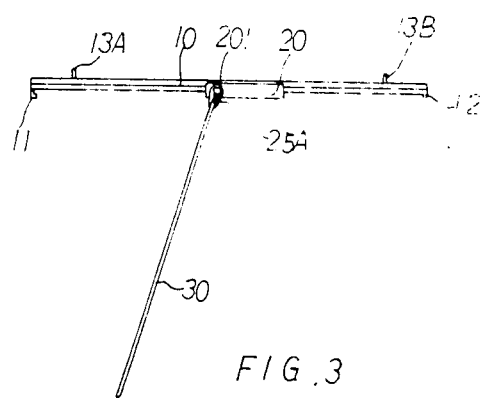
FIG. 3 is the side view of the present invention.
Figure 4:
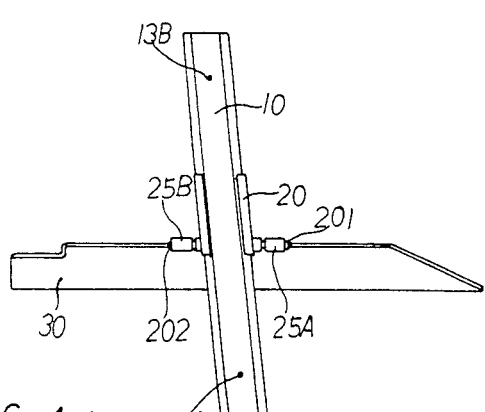
FIG. 4 is the top view of the present invention.
Figure 5:
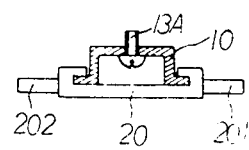
FIG. 5 is a sectional view of the slider member in engagement with the track bar.
Figure 6:
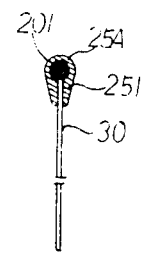
FIG. 6 is a view showing a C clip mounted on the shaft bar and holding the transparent filter plate.

Referring to FIG. 1, the retractable glare shield device mainly comprising a track bar 10, a slider member 20, a pair of C-shaped clips 25A, 25B and a stiff transparent filter plate 30 of plastics material, said track bar 10 is first removably attached to the ceiling 40 of the vehicle by screws 13A, 13B on which is slidably mounted the slider member 20 as shown in FIG. 5, a pair of shaft bars 201, 202 are extendedly disposed on both sides of the slider member 20 for the attachment of a pair of C-shaped clips 25A, 25B respectively as shown in FIG. 6, which grasp said filter plate 30 by their open ends 251, 252 respectivelyso that the filter plate 30, slider member 20 and the track bar 10 are assembled in a slidable and adjustable manner for facilitating the driver of a vehicle to dispose said filter plate 30 behind the front windscreen 50 or to receive it under the ceiling 40 of the vehicle as shown in FIGS. 2, 3, and 4.

Figure 7:
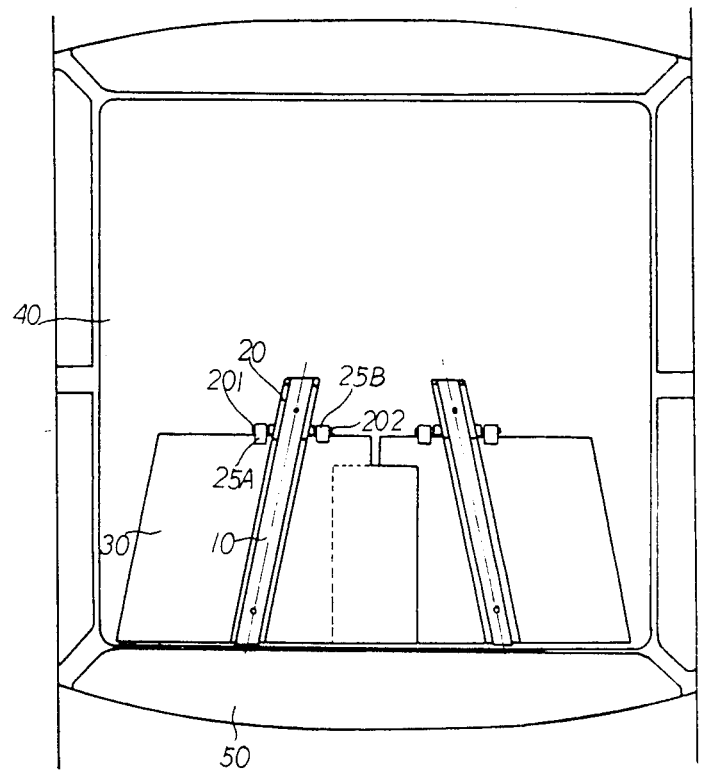
FIG. 7 is a view showing the filter plate being horizontally positioned under the ceiling of a vehicle.
Figure 8:
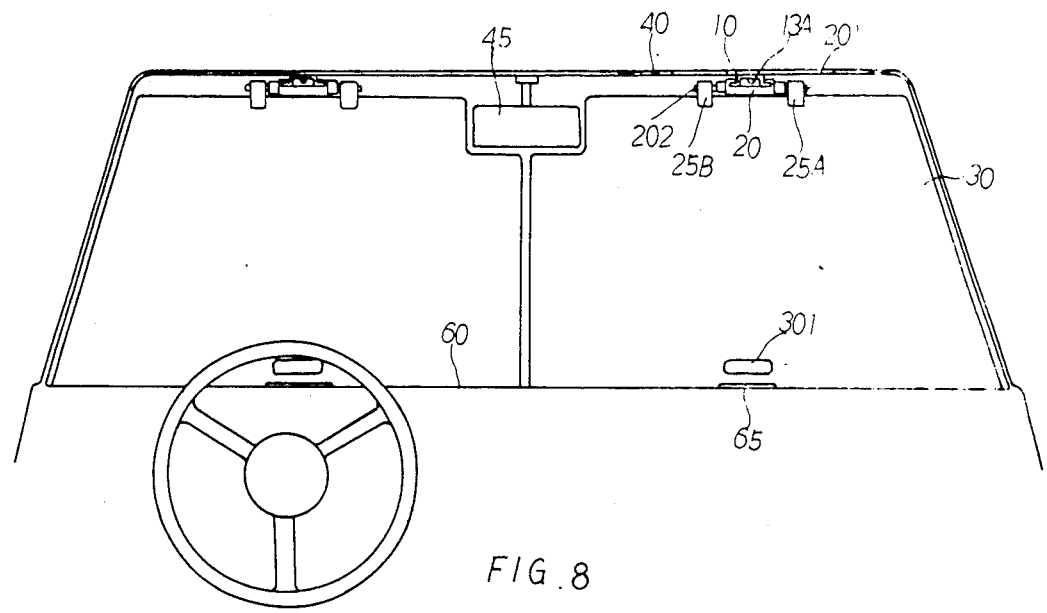
FIG. 8 is a view showing the filter plate being disposed in front of the steering wheel and behind the windscreen of the vehicle.

As shown in FIG. 7, said track bar 10 is inclinedly disposed on the ceiling of the vehicle with its orientation toward the center thereof, this arrangement permits the transparent filter plate 30, held by a pair of C-shaped clips 251, 252 mounted on a pair of extended shaft bars 201, 202 respectively, to be parallely positioned behind the front windscreen of the vehicle 50 and to cover all the area thereof for better filter effect as demonstrated in FIG. 8. When not used, the stiff transparent filter plate 30 can be received along the track bar under the ceiling of the vehicle without occupying much pace. In case of two filter plates 30 being installed, the track bars 10 are located under the ceiling with one placed in a higher position than the other so that the two filter plates will not interfere with each other in operation and can be received at the same time under the ceiling in an overlapping manner.

Figure 9:
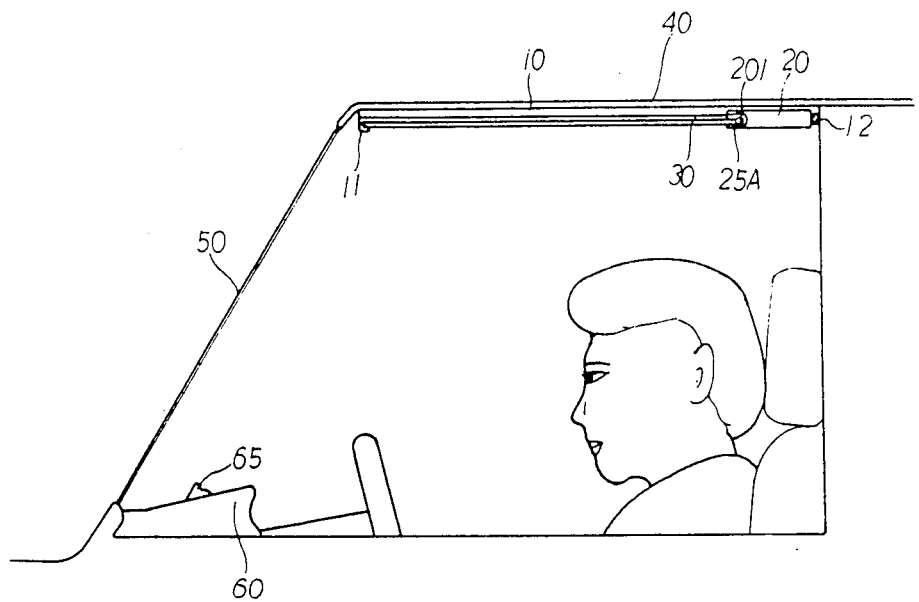
FIG. 9 is a side view showing the filter plate being received under the ceiling of the vehicle.
Figure 10:
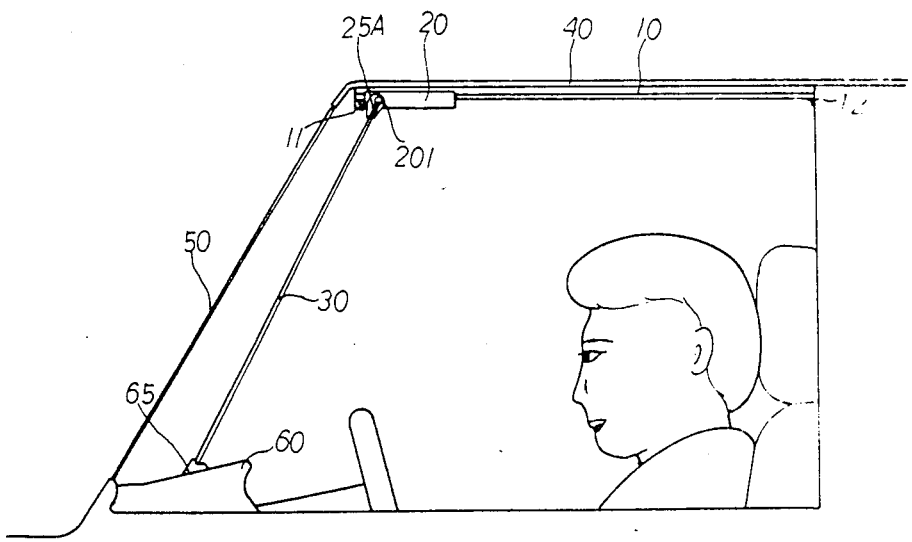
FIG. 10 is a side view showing the filter plate being positioned for use.

Refer further to FIG. 3, an L-shaped hook 11 is disposed at the front end of said track bar 10, and a stop means 12 is positioned at the opposite end thereof for preventing said slider member 20 from disengaging therefrom in sliding, and the up-pushed filter plate 30 is received under said ceiling 40 with part of its front edge engaging with said L-shaped hook 11 for firmly locating said plate 30 in place so that it will not move in the driving as shown in FIG. 9. Said filter plate 30 is configured with one of its corners removed so that the installed plate 30 will not interfere with the normal operation of the rear-view mirror. An slot-like opening 301 is disposed near the front edge of said plate 30 for facilitating the operation thereof. As shown in FIG. 10, a plate fixing means 65 is mounted on the top of the dashboard 60 so to firmly hold the plate 30 in place and further protecting the surface of the dashboard from being scrashed by said filter plate. It is clearly seen that the extractable glare shield device is simply-structured, readily-installed and easily-operable, and can effectively block strong sunlight from directly coming into the eyes of the driver and also shelter external heat from fluxing in by effective reflection ability of said filter plate.

I claim:

1. An extractable glare shield device for automobiles mainly compring:
    a track bar inclinedly disposed on the ceiling of a vehicle, and an L-shaped hook being attached to the front end thereof and a stop means to the opposite end thereof;
    a slider member slidably mounted on said track bar having a pair of shaft bars disposed respectively on both sides thereof with the center line of said shaft bars always parallel to the windscreen of of the vehicle;
    a stiff transparent filter plate which is tinted for the purpose of filtering sunlight and configured with one of its corners removed and a slot-like opening positioned near the front side thereof for ready operation;
    a pair of C-shaped clips rotatably mounted on said shaft bars respectively being used to detachably affix said filter plate to said slider member;
and the above said components being assembled in such a manner that the filter plate can be pulled down from the ceiling of said vehicle and positioned behind said windsereen for shielding glare sun beam, and be horizontally received under the ceiling thereof for space-saving purpose.

* * * * *